United States Patent

[11] 3,597,572

| [72] | Inventors | Donald H. Ettinger<br>Royal Oak, Mich.;<br>Herbert F. Rondeau, Winchester; Hans F.<br>Schaefer, Jr., Rockport, Mass. |
|---|---|---|
| [21] | Appl. No. | 5,274 |
| [22] | Filed | Jan. 23, 1970 |
| [45] | Patented | Aug. 3, 1971 |
| [73] | Assignee | Warren Fastener Corporation<br>Mount Clemens, Mich. |

[54] STUD WELDING GUNS
13 Claims, 7 Drawing Figs.

[52] U.S. Cl. ........................................... 219/98,
                                                        279/1 R
[51] Int. Cl. ........................................... B23k 9/20
[50] Field of Search ........................................... 219/98, 99,
                                                        95; 279/1 R; 287/78

[56]                    References Cited
                UNITED STATES PATENTS
2,647,701   8/1953   Cannard..................... 279/1 R

| 2,749,133 | 6/1956 | Rich................ | 279/1 R |
| 3,162,746 | 12/1964 | Ritter et al.................... | 219/98 |
| 3,242,307 | 3/1966 | Mowry et al................. | 219/99 |
| 3,291,958 | 12/1966 | Glorioso...................... | 219/98 |
| 3,445,619 | 5/1969 | Kelemew...................... | 219/98 |

Primary Examiner—J. V. Truhe
Assistant Examiner—Robert G. O'Neill
Attorneys—Richard A. Wise, Carl E. Johnson and Richard B. Megley ABSTRACT: A stud-welding gun that provides a clutch and an actuator which permit a reliable means for welding studs of various lengths. The clutch is of expansible friction type and includes a solenoid-operated means for axially compressing an elastomeric gripping member which locks a stud-gripping collet mechanism and the clutch in a fixed axial relationship.

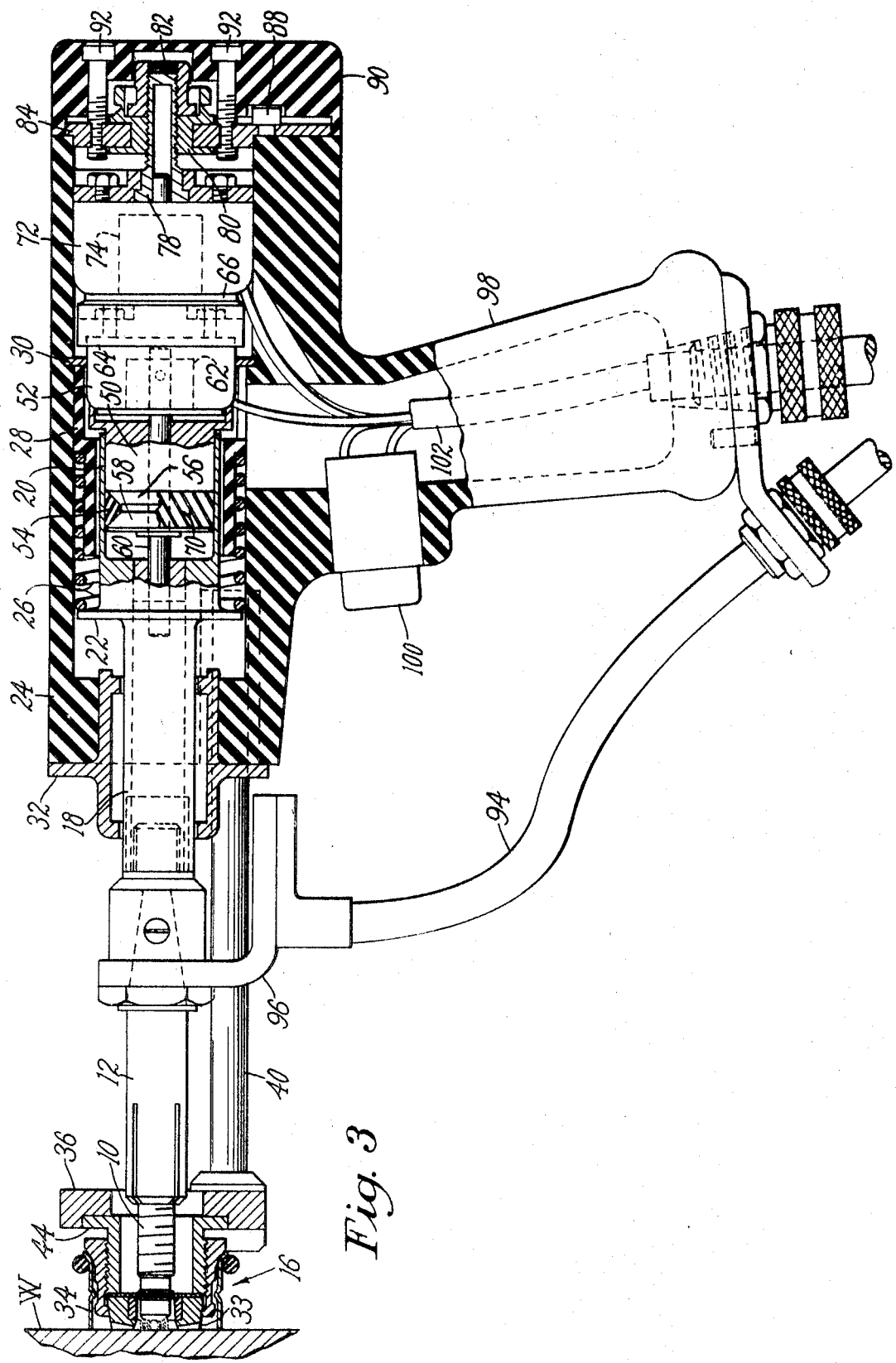

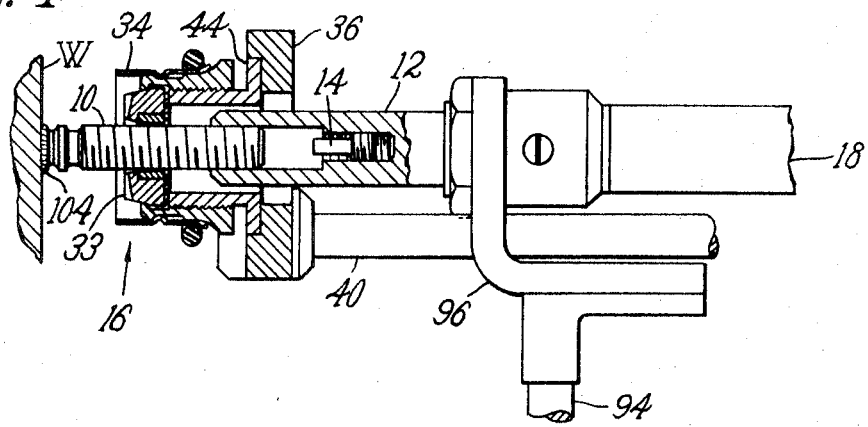
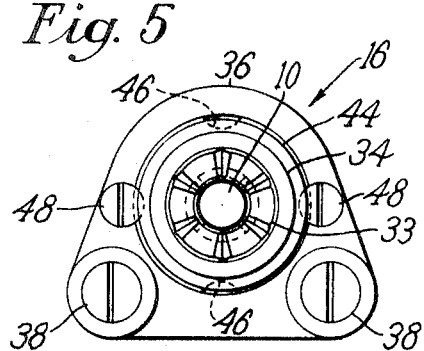
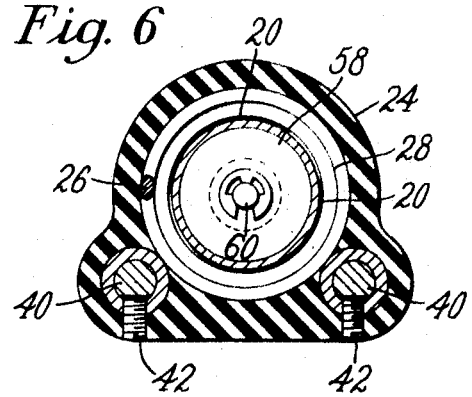
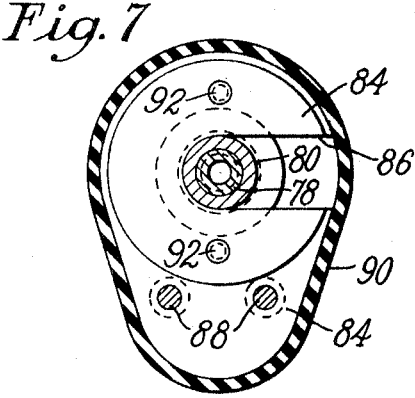

STUD WELDING GUNS

CROSS-REFERENCE TO RELATED APPLICATIONS

U.S. Pending application, Ser. No. 813,239, filed Apr. 3, 1969, now U.S. Pat. No. 3,557,339 in the name of Herbert Rondeau discloses a semipermanent ferrule or arc shield of the type shown and preferably, though not necessarily, employed in the welding gun herein to be described. Also, copending application Ser. No. 194, filed Jan. 2, 1970, in the name of Donald H. Ettinger discloses a stud having the novel configuration herein shown for use with the mentioned Rondeau ferrule, though it will be understood that the present invention is by no means restricted for use with the subject matter of either of these pending applications.

BACKGROUND OF THE INVENTION

In the process of arc-welding studs (or pins or the like), a stud inserted in the gripping collet of a gun is first yieldably thrust against a work surface to bring the stud end and the end of the gun flush with the work surface. It is usual next to cause stud retraction from the surface to which it is to be welded and to more or less simultaneously strike the welding arc. Then the molten end of the stud is plunged into material of the supporting surface and the joint formed is allowed to cool. In the sequence briefly indicated, a number of variables come into play and interplay at about the same time; any or all of these variables may be critical to the production of consistently high quality weldments. One persistently troublesome factor has been that of obtaining a uniform predetermined gap between the end of each stud when retracted during arcing and the surface which is to receive the stud. This particularly critical problem arises in the in the first instance because, though studs may be of uniform standard diameters, their lengths are not consistently the same.

Previous efforts to normalize the effective lengths of welding studs have utilized clutch means in conjunction with stud-retracting mechanism of welding guns, but unfortunately the known arrangements have not been entirely successful. In one arrangement, for instance, the stud is intended to be firmly locked by a retractable ring for applying a so-called "monkey bite," and another approach employs a clutch of the sliding cone and spreading ball type. These and other prior art stud-normalizing efforts commonly fail because the means gripping the stud slides axially thereon an intermediate amount before and during stud retraction from the surface to which it is to be secured. Consequent results of the retraction of studs to nonpredetermined positions are different strengths of welding arcs, irregular burn-offs, different forces for plunging the molten stud against the receiving work surface, and a general lack of control which produces welding joints lacking in consistently good quality.

SUMMARY OF THE INVENTION

In view of the foregoing a main object of this invention is to provide in an arc-welding gun a simple yet reliable mechanism for effecting normalizing of the lengths of studs to be welded whereby actual deviations in stud lengths will be of no adverse effect on the welding quality attained.

Another aim of this invention is to provide an improved arc-welding gun wherein a novel and simple clutch means effectively locks a stud or the like to stud-retracting mechanism of the gun in a nonslipping relation and thereafter other means is automatically operative to yieldingly retract the retracting mechanism with the locked stud to establish in adjustable but predetermined arc gap between an end of the stud and the surface to which it is to be welded.

To these ends a feature of the invention resides in providing, in an arc-welding gun having a main body and a stud-gripping mechanism including a collet relatively retractable therein to predeterminately space an end of a stud held by the collet with respect to the locality of engagement of an end of the body with a work surface, a clutch mounted for movement in the body and energizable to be locked in axial relation to the collet-retracting mechanism as predetermined by abutment of the stud initially with the work surface, and an actuator mounted in the body and operable for shifting the clutch when thus locked to establish a selected axial spacing between the mentioned end of the stud and the work surface.

More specifically, and as herein shown, the clutch and the actuator are preferably both electromagnetically energized and coaxially disposed in the gun. The clutch is advantageously of expansible friction type and includes a solenoid operated means for axially compressing and hence radially dilating an elastomeric gripping member thus locking the stud-gripping collet mechanism and clutch-operating means in fixed axial relation. The actuator is preferably also a solenoid of greater power than that controlling the clutch, the arrangement being such that the larger solenoid is automatically effectively energized only after the clutch solenoid has operated. This insures that when the clutch solenoid abuts an adjustable stop in the gun, such as the housing of the actuator solenoid, the weldable end of the stud will be in the desired spaced relation to the work surface. A single control switch conveniently energizes the solenoids sequentially and enables deenergization of the solenoid means, decompressing the radially dilated gripping member, thus unlocking the stud-gripping collet mechanism after a suitable arcing interval, whereby a spring which had been finally compressed by the actuator solenoid operation is released to plunge the molten stud end into weld-forming relation with the work surface.

BRIEF DESCRIPTION OF THE DRAWINGS

The foregoing and other features of the invention, together with novel details in construction and combinations of parts, will now be more particularly described in connection with an illustrative embodiment, and with reference to the accompanying drawings thereof, in which:

FIG. 3 is a view similar to FIGS. 1 and 2 but showing the gun at a later stage when a solenoid has finally retracted the stud to arc drawing position;

FIG. 4 is i view in elevation of the front end of the gun at a final stage, a portion being broken away to show the stud plunged against the work surface to form a weldment;

FIG. 5 is an end view taken in the direction of arrows V-V of FIG. 1;

FIG. 6 is a transverse section taken on the line VI-VI of FIG. 1; and

FIG. 7 is a transverse section taken on the line VII-VII of FIG. 1.

DESCRIPTION OF THE PREFERRED EMBODIMENT

Figure 1:
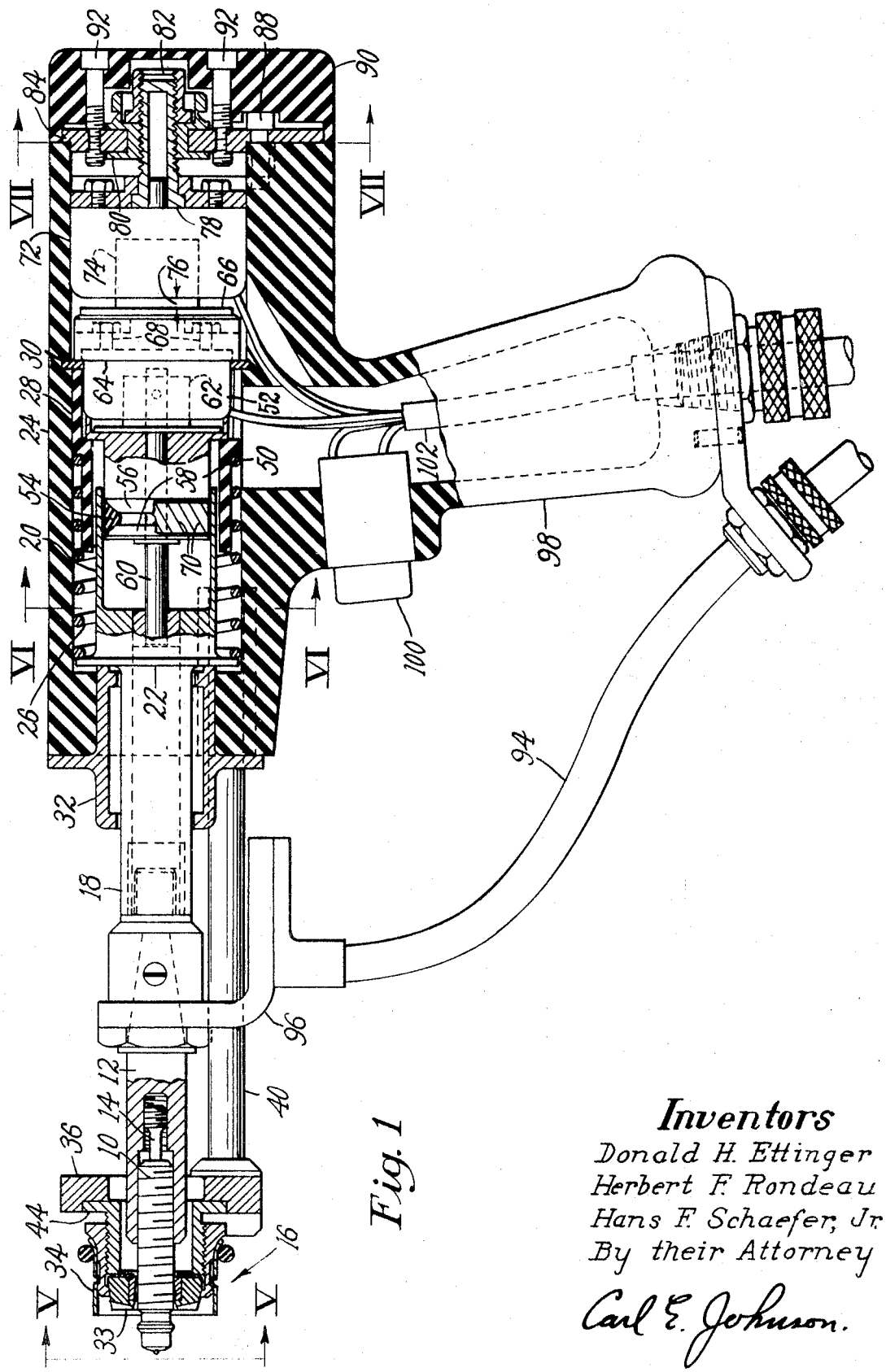
FIG. 1 is a view in side elevation, largely in axial section, of an arc-welding gun in inoperative condition, a stud to be welded being inserted in its collet jaws.

Referring to FIG. 1 a stud 10 or the like to be welded is first inserted endwise into the gripping jaws of a collet 12 until the end of the stud contacts an electrode 14 adjustably threaded into the collet. The stud itself may differ in length from others having the same diameter and hence it may initially project forwardly out of a ferrule assembly generally designated 16 and telescopically mounted on the collet by a different amount. The rear or inner end of the collet 12 is removably coupled to stud holding and retracting mechanism including a member 18 having an inner enlarged cylindrically tubular clutch portion 20 hereinafter referred to and an intermediate retainer flange 22. The member 18 is normally urged forwardly in a hollow nonconductive main body 24 of the gun by means of a compression spring 26 acting on the flange 22 and confined by a shoulder of a sleeve 28. The latter is prevented from being displaced rearwardly by a snap ring 30 nested in an interval groove of the body 24. A guide bushing 32 fitting in a bore of the body 24 slidably receives the member 18 and serves as a stop for the flange 22.

Figure 2:
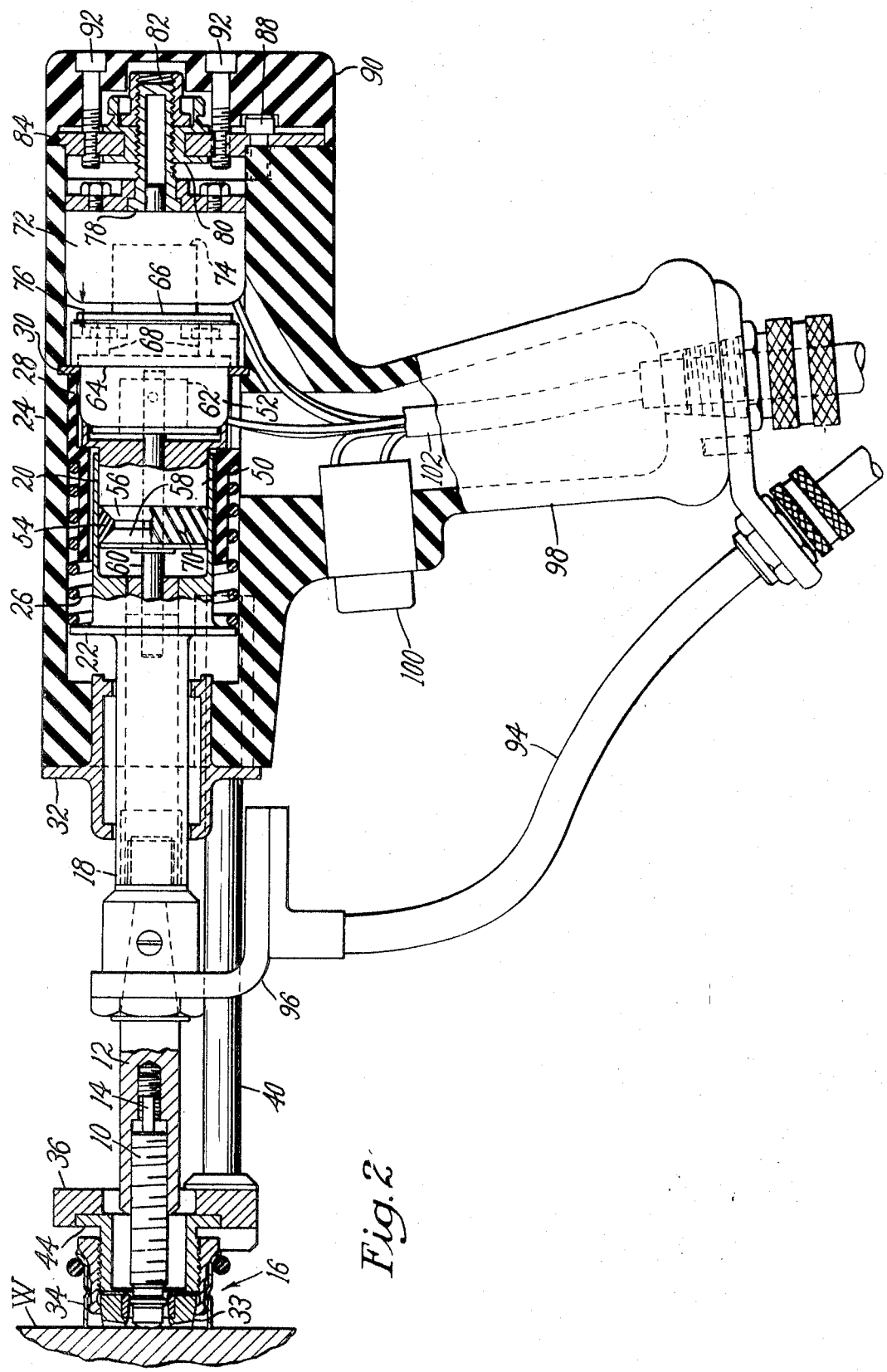
FIG. 2 is a view similar to FIG. 1 but showing the relative position of parts when, at the next stage in a cycle, the stud has been thrust against a work surface and a solenoid clutch is energized.

When, as shown in FIG. 2, the gun body 24 is thrust endwise against a work surface W to which the stud 10 is to be welded, the collet 12 and the member 18 are forced rearwardly relative to the ferrule assembly 16 and with respect to the gun body 24 thereby partially compressing the spring 26 until a ferrule 33 and its guard 34 engages the surface W. The ferrule assembly 16, which may be of semipermanent type as disclosed in the mentioned Rondeau application, is provided with a mounting collar 36 (FIGS. 1—3 and 5) secured by screws 38 (FIG. 5) respectively to the front ends of a pair of parallel rods 40, 40. These rods are nonrotatably held in the body 24 by said screws 42, 42 (FIG. 6). In order conveniently to detach the assembly 16 and as shown in FIG. 5, a sleeve 44 of the assembly 16 has semicircular slots 46, 46 disposed 180° apart. Accordingly, a half-turn of the assembly 16 relative to the collar 36 permits axial withdrawal of the assembly relative to the heads of a pair of retainer screws 48, 48 threaded into the collar 36.

It is to be noted that in initially thrusting the gun body 24 forwardly toward the surface W preparatory to welding, the tubular clutch portion 20 of the member 18 is telescoped part way over a cylindrical guide block 50 (FIGS. 1—3) affixed to the front of a clutch-operating solenoid 52 itself axially slidable in the body 24 within limits about to be explained. The portion 20 also coaxially receives a radially expansible clutch band 54, preferably V-shaped in cross section and of an elastomeric material such as polyurethane of relatively low durometer. The band 54 is disposed between a conical surface 56 formed on the block 50 and a cooperative complemental surface 58 of a plunger 60 axially shiftable in a ball of the block 50 by an armature 62 of the solenoid 52. When the latter is in deenergized condition the diameter of the band is very slightly less than that of the internal wall of the portion 20; but when the coil of the solenoid 52 is energized as later explained the plunger 60 is axially urged rearwardly to compress the band 54 between the surfaces 56, 58 thereby radially expanding the band into tight frictional gripping relation with the clutch portion 20. Thus the inserted stud 10 is locked in fixed axial relation to the stud holding and retracting mechanism about to be described. The snap ring 30 serves at this time to limit forward movement in the gun of the solenoid 52 by abutting a shoulder 64 of an adapter 66 secured by screws 68 on the rear end of the solenoid 52.

In order to facilitate radial expansion and better gripping action by avoiding circumferential distortion of the clutch band 54, sometimes referred to as a "tire," its circumferential gripping surface is formed with lands spaced by diagonal slits 70 (FIGS. 1—3). Also, though not shown in the drawings, the clutch portion 20 may have its internal wall formed serrations for insuring against slippage when they are radially engaged by the tire lands.

With the clutch mechanism 20, 54 in locked relation, control circuitry only partly shown in FIGS. 1—3 thereupon automatically effective as will next be described to energize a coil of a large solenoid 72 adjustably secured axially in the rearward end of the gun whereby final stud retraction is accomplished as desired and stud length effectively normalized.

The solenoid 72 has its axially shiftable armature 74 coupled to the adapter 66 of the smaller solenoid 52. It will be noted in FIGS. 1 and 2 that the rearward face of the small clutch solenoid 52 is spaced from the front of the larger stud-retracting solenoid 72, but that this gap 76 in FIG. 2 (a measure of the predeterminately selected and normalized arc gap shown in FIG. 3) is closed in FIG. 3 upon energization of the solenoid 72 to retract not only the solenoid 52, but the actuated clutch band 54, the clutch portion 20 locked thereon, and hence the collet 12 and the stud 10. The solenoid 72 is adjustably secured in the body 24 by means of an axial rod 78 (FIGS. 1—3 and 7) anchored to the back end of the solenoid and threadedly received in a circumferentially grooved nut 80 and a locknut 82. A plate 84 closing the back end of the body 24 is formed with a radial slot 86 (FIG. 7) to enable the plate to be fitted into the groove of the nut 80, and the plate is secured to an end of the body 24 by screws 88, 88 when the nuts 80, 82 are in selected axial relation to the rod 78. An end cap 90 is secured to the plate 84 by screws 92, 92.

It will be understood that the circuitry and electrical controls for the gun are not herein fully shown, except for a portion directly associated with it, since it may be assumed that they are well known in the art. Welding current is supplied to the electrode 14 by means of an electric cable 94 (FIGS. 1—3) secured by a terminal 96 to a nonsplit portion of the collet 12 and bracketed to a hollow grip portion 98 of the body 24. A switch button 100 is arranged on the grip and connected to the control circuitry by lines extending through a cable 102. Depression of the button 100 is effected, it will be understood, to cause a pilot arc voltage to be applied to the inserted stud 10 while its tip is still in contact with the surface W, when to energize the solenoid 52 for clutching the partially retracted stud as described with reference to FIG. 2, and thereafter to supply arc-welding current to be normalized stud as the larger solenoid 72 is energized to maintain the stud fully retracted for a suitable time while the welding arc is drawn. After the welding current has been applied for the appropriate time interval the solenoid 72 is deenergized and the molten end of the stud 10 is allowed to be plunged by the now released spring 26 against the highly heated material of the surface W as shown in FIG. 4.

By reason of the normalizing action of the dual solenoid operation, first to positively grip the stud as initially positioned endwise by its welding end contact with the surface W, and then to effect final retraction to a selectively predetermining position whereat the desired arc gap has been created, the gun is enabled repeatedly to effect a consistently good welding joint 104 (FIG. 4) regardless of variant stud lengths.

Having thus described my invention, what I claim as new and desire to secure by Letters Patent of the United States is:

1. An arc-welding gun comprising a hollow main body having a work-engaging end, means connecting the gun to a power source for providing a stud-welding arc, a retractable stud-gripping mechanism mounted in the body for yielding movement away from said end, a clutch means movable in the body and operable to lock said mechanism in fixed position relative to the work surface when said end and a stud held by the mechanism have been caused forcibly to engage the work surface, and power means operable thereafter further to retract the clutch mechanism and hence the stud a selected predetermined distance from said surface during arcing.

2. A gun as set forth in claim 1 wherein the clutch means comprises a radially expansible member for gripping a portion of the stud-gripping mechanism, and electromagnetic means for controlling operation of said member.

3. A gun as set forth in claim 2 wherein said member is in the form of an elastomeric ring circumferentially engageable with a cylindrical wall of said gripping mechanism.

4. A gun as set forth in claim 2 wherein said member is a V-shaped polyurethane band.

5. A gun as set forth in claim 4 wherein the electromagnetic means is a solenoid shiftable axially in the main body and energizable to cause its armature axially to compress said band and thereby lock it to said mechanism.

6. A gun as set forth in claim 1 wherein the clutch means comprises a solenoid operable axially in the body and energizable to squeeze an expansible band and thus lock the gripping mechanism axially with respect to the work surface, a second solenoid secured in the body and operatively connected to the first-mentioned solenoid, and control means for energizing the second solenoid after the first solenoid his been energized and during arcing.

7. A gun as set forth in claim 1 wherein the work-engaging end of the body includes a detachable ferrule assembly for axially receiving a stud to be welded and disposed to abut the work surface in the vicinity of the stud, and said stud-gripping mechanism comprises, in coaxial relation to the ferrule assembly, an axially split collet and a member coupled at one end to the collet and extending into the tool body, said member having at its inner end a tubular clutch portion arranged in telescoping relation to said clutch means.

8. An arc-welding gun comprising a hollow main body provided with a work-engaging ferrule end adapted to surround a stud or the like to be welded to a work surface, the gun being connectable to a power source for providing welding current, retractable mechanism mounted on the gun body including a stud-gripping collet initially arranged to hold a weldable end of the stud projecting beyond the ferrule end and adapted to move the stud axially in the ferrule end, a spring for urging said mechanism toward the ferrule end, said mechanism including a clutch portion axially disposed in the body, a clutch-operating solenoid, a radially expansible clutch band cooperative with said clutch portion and responsive to energization of the clutch solenoid to lock said retractable mechanism in an axial position determined by thrusting the stud gripped by the collet against the work surface until both the weldable end of the stud and the ferrule end abut said surface, and an actuating solenoid mounted in the body and energizable for effecting retraction of the stud-gripping mechanism and said stud against the influence of said spring, said actuating solenoid being effectively operable only after operation of the clutch-operating solenoid to establish a predetermined arc gap for the weldable end of the stud with respect to said surface.

9. A gun as set forth in claim 8 wherein means is provided for adjusting the axial position of the actuating solenoid to modify said arc gap.

10. An arc-welding gun comprising a body provided with a work-engaging end, a stud-holding collet initially arranged to grip a stud and hold its weldable end axially projecting beyond said body end, means for striking a welding arc between the stud and a work surface, a member axially shiftable in the body and coupled to the collet, a spring for resisting relative axial displacement of the collet and said member relative to the body, a clutch frictionally engageable with said member to lock it in a normalized stud length position relative to said work surface when the weldable stud end abuts the work surface and said end of the body is also urged against said surface, and electromagnetic means mounted in the body and operative after the clutch has locked onto said member to retract the locked member and hence the stud a predetermined distance from the surface.

11. In a stud-welding gun having a body provided with a work-engaging end, means for connecting the gun to a power source for providing a welding arc, a yieldably retractable stud-gripping mechanism, a solenoid energizable to yieldably retract the stud-gripping mechanism in the body and a stud gripped by said mechanism from a work surface, a solenoid-operated clutch interposed between said mechanism and said retractive solenoid for fixing the axial position of said mechanism when the stud and said body contact the work surface, and a control means for effectively locking the solenoid-operated clutch to the gripping mechanism before the retracted solenoid is energized whereby the stud is retracted a predetermined distance from said surface during arcing.

12. In a gun for arc-welding studs having lengths to be normalized, a hollow main body provided with a work-engaging end, a stud-gripping collet for moving a stud to be welded and movable in coaxial relation to said work-engaging end, retractable mechanism in the body coupled to the collet, spring means urging the collet to project a stud gripped thereby beyond said work-engaging end, an expandable clutch band axially shiftable in the body and arranged to cooperate with a portion of said mechanism, a solenoid mounted for limited axial movement in the body and having its armature operatively connected to the clutch band, a second and larger solenoid secured in the body and having its armature operatively coupled to the smaller solenoid, and electrical control means for energizing the smaller solenoid before the larger solenoid is energized.

13. The method of arc-welding variant lengths of studs which comprises:
   a. inserting a welding stud into the collet of collet-retracting mechanism yieldingly urged forwardly in an arc-welding gun,
   b. forcing an end of the gun and of the inserted stud simultaneously to abut a surface to which the stud is to be welded thereby causing the stud to relatively rearwardly displace the collet-retracting mechanism in the gun,
   c. energizing a solenoid-operated clutch in the gun to fix the axial relation of the clutch to said mechanism when thus rearwardly displaced,
   d. thereafter striking a welding arc and energizing a solenoid coupled to said clutch finally to retract the mechanism and the stud a selected predetermined arcing distance from said surface, and
   e. deenergizing the clutch solenoid to cause the stud to be plunged against said surface.